Dec. 12, 1961
C. M. ASHLEY
3,012,409
METHOD AND APPARATUS OF RENDERING SALINE WATER POTABLE
Original Filed June 28, 1955
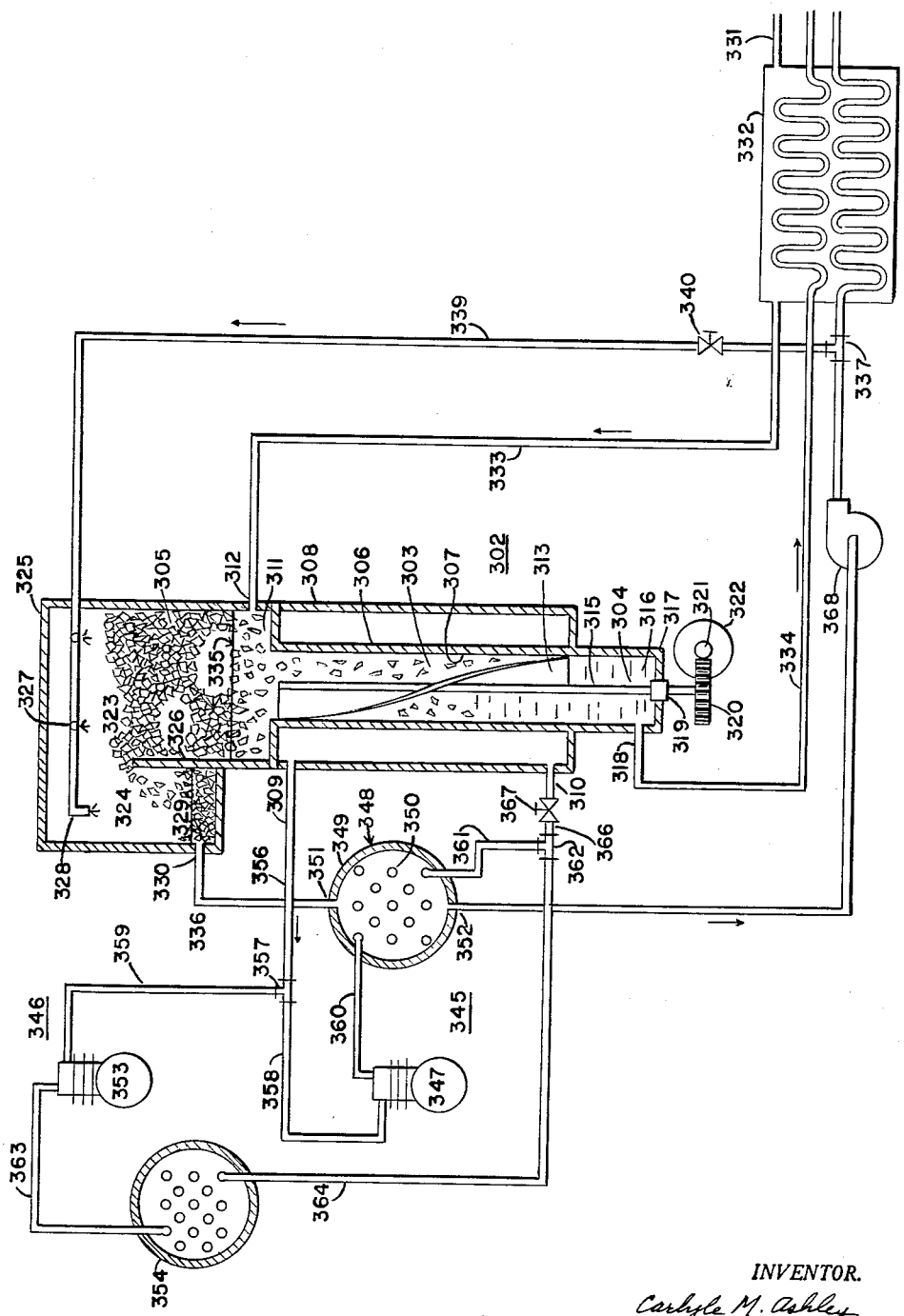
INVENTOR.
Carlyle M. Ashley
BY Herman Seid
Atty.

United States Patent Office 3,012,409
Patented Dec. 12, 1961

3,012,409
METHOD AND APPARATUS FOR RENDERING SALINE WATER POTABLE
Carlyle M. Ashley, Fayetteville, N.Y., assignor to Carrier Corporation, Syracuse, N.Y., a corporation of Delaware
Original application June 28, 1955, Ser. No. 518,431. Divided and this application Dec. 11, 1957, Ser. No. 702,204
4 Claims. (Cl. 62—58)

This application is a division of my copending application, Serial No. 518,431, filed June 28, 1955, and relates to a method and apparatus for rendering saline water potable and, more particularly, to a method and apparatus for converting sea water to potable water.

It is known that sea water may be purified by freezing. No commercially satisfactory system has heretofore been devised. Those systems which have been advanced either demand extravagant amounts of energy or else purify water inadequately. For example, prior centrifugal separation systems had failed for even the great centrifugal forces used were insufficient to overcome the tenacity with which the brine clings to the finely divided ice. Washing systems were unsuccessful because of the tremendous amount of fresh water which they required. These difficulties are more readily understandable when it is understood that the brine not only clings to the surface of the ice but also remains in the interstices between the ice crystals. This difficult situation is further aggravated by the need to reduce the impurity content of the water to less than 800 parts per million in order to render it potable.

The chief object of the present invention is to provide a method and apparatus for rendering saline water potable utilizing a freezing operation which obviates the disadvantages present in systems heretofore known.

An object of the present invention is to provide apparatus for converting a brine solution such as sea water to potable water which is highly efficient and effective in operation and which utilizes a freezing operation to concentrate or remove potable water from the solution.

A further object is to provide apparatus for forming and separating potable water from a brine solution such as sea water in which freezing means are employed to form ice from the brine solution, the ice being removed from the solution, further cleaned to remove brine and melted to provide potable water.

A still further object is to provide a method of forming potable water from a saline solution such as sea water. Other objects of the invention will be readily perceived from the following description.

This invention relates to a method of rendering saline water potable in which the steps consist in passing saline water in heat exchange relation with a refrigerated surface, forming ice on the surface, removing the ice from the surface, separating the ice from the saline water and washing the brine from the surface and interstices of the ice. The word "brine" is employed herein to denote salt in solution and in a crystalline form.

This invention further relates to a system for rendering saline water potable which comprises a refrigerated surface, means for passing saline water in contact with the surface to form ice thereon, means for removing ice from the refrigerated surface, means for separating the ice from the saline water and means for washing the brine from the surface and interstices of the ice.

The attached drawing illustrates a preferred embodiment of the invention.

Referring to the drawing there is shown a unit 302 which combines the operations of freezing, separating and washing the formed ice to form potable water. This unit 302 comprises three sections; a freezing section 303, a brine settling section 304 and a washing section 305.

The freezing section 303 comprises a vertical cylindrical shell 306 having a cylindrical inner wall 307. This shell has a jacket 308 which combines with the shell to form a flooded evaporator to refrigerate the wall 307. The refrigerant is introduced to the evaporator through the inlet 310 and discharged from the jacket through the outlet 309.

The jacket 308 together with the shell 306 forms a flooded evaporator for a primary refrigeration system 345 and a secondary refrigeration system 346. The primary refrigeration system includes a compressor 347 and a condenser 348. Condenser 348 includes a shell 349 containing a coil or tube bundle 350 through which refrigerant is circulated. Shell 349 contains a potable water inlet 351 and a potable water outlet 352. The secondary refrigeration system 346 includes a compressor 353 and a condenser 354 which may be of any suitable type depending upon the most convenient way for removing heat from the condenser. In the present embodiment, sea water may be used as a cooling medium for this secondary refrigeration system condenser.

Gaseous refrigerant leaves the evaporator through outlet 309, and suction line 356 to a T 357. At T 357, the refrigerant is drawn into the compressor of the primary refrigeration system through line 358 and into the compressor of the secondary refrigeration system through line 359. Compressor 347 discharges compressed gaseous refrigerant through line 360 to the condenser coil 350, the gaseous refrigerant being condensed by potable water produced by the water purification system as hereinafter explained. Liquid refrigerant passes through line 361 to T 362. Simultaneously, compressor 353 of the secondary refrigeration system compresses gaseous refrigerant supplied through line 359 and supplies the compressed gaseous refrigerant through line 363 to the condenser 354 in which the gaseous refrigerant is condensed. Liquid refrigerant is supplied from the condenser 354 through line 364 to T 362. At T 362, the streams of liquid refrigerant from the primary and secondary refrigeration systems join and are supplied through line 366 to inlet 310 of the evaporator. A suitable valve 367, for example a float valve or the like, regulates flow of liquid refrigerant to the evaporator.

Immediately above the cylindrical shell 306 is located an annulus 311. Located immediately above the annulus is a sea water inlet 312. As sea water is introduced through this inlet, the sea water flows on to the annulus which disperses the sea water so that it flows down along the refrigerated wall 307, forming ice thereon. As the ice is formed a blade 313 rotates within the cylindrical shell and removes the ice from the shell surface. This blade 313 is attached to a shaft 315 which is operatively connected to a motor 322. A more detailed description of the operation of the freezing section will be hereafter presented.

Directly below the freezing section there is located a brine settling section 304 which comprises a cup shaped cavity 316 formed by the walls 317. Located adjacent the bottom of the cavity 316 is a brine discharge outlet 318.

Above the freezing section is located a washing section 305. This washing section comprises a washing area 323 and an adjacent melting area 324. Both areas are enclosed by a hood 325. Located between the melting area and the washing area is a partition 326.

Nozzles 327 are placed above the washing area 323; nozzles 328 are placed above the melting area. The melting area includes a hopper 329 containing a potable water outlet 330.

As ice is formed in the freezing section, the blade 313 removes the ice from the refrigerated wall 307 and slowly forces the ice upwardly. As the ice moves upwardly nozzles 327 spray potable water thereover to wash the ice; as the ice continues to move upwardly, it falls into the hopper 329, potable water being sprayed thereover by nozzles 328 to melt the ice. The potable water is withdrawn from the hopper through outlet 330.

In operation, sea water is supplied through line 331 to heat exchanger 332, the sea water being chilled and reduced in temperature near its freezing point. The chilled water passes through line 333 to the inlet 312 of unit 302. As the water is introduced into the unit 302 through inlet 312, the water is discharged on the annulus 311. The plane of annulus 311 is normal to the axis of the cylindrical shell 306, annulus 311 acting as a dispersing plate for distributing water over the refrigerated surface 307. The distributed sea water will be partially frozen as it contacts refrigerated surface 307 forming ice thereon, the remaining brine solution flowing downward to the brine settling section. The blade 313 removes the ice from the refrigerated surface 307, the buoyancy of brine solution urging the ice upwardly. Simultaneously, the brine solution passes down into the brine settling section 304. The brine solution which settles in the cup shaped container 316 is discharged through outlet 318, and passes through line 334 to the heat exchanger 332. In the heat exchanger, this low temperature brine solution is used to chill the incoming sea water. The brine solution is then discharged from the system.

The ice rises above the brine solution level 335. This brine solution level, referring to the drawing, is substantially above the level of the sea water inlet 312. As the ice emerges from the brine solution, potable water is sprayed from nozzles 327 over the surface of the ice and washes the brine from the surface and interstices of the ice. As the ice continues to rise, it passes into the hopper 329 where fresh water from the melting nozzle 328 is sprayed over the ice to melt the ice. The potable water so obtained is withdrawn through the discharge outlet 330, line 336 and condenser 348, where the refrigerant is cooled, and then forwarded by pump 368 to the heat exchanger 332. In the heat exchanger the potable water is again utilized to lower the temperature of the incoming sea water. Located in the line 336 before the heat exchanger is the T 337 which supplies part of the potable water to the heat exchanger and then to a place of use or storage, while the remaining potable water is recirculated through line 339 to the nozzles 327, 328. A valve 340 is placed in line 339 to regulate the amount of recirculated water.

The present invention has been described with particular reference to the formation of potable water from sea water. It will be understood the structure and method of the invention may be applied to the concentration of fruit juices, purification of water, etc., with only slight adaptations in the present equipment and described methods.

While I have described a preferred embodiment of the invention, it will be understood the invention is not limited thereto since it may be otherwise embodied within the scope of the following claims.

I claim:
1. In a system for rendering saline solution potable the combination of a vessel having an upper separating section; an intermediate freezing section and a lower brine solution concentrating section; said freezing section comprising a cylindrical refrigerated passageway, a member rotating in said passageway to remove ice from the wall of the passageway; means for introducing a brine solution into said passageway; said brine solution concentrating section comprising an unrefrigerated extension of the freezing section to collect and to discharge brine solution from the system; said separator section including a trough and washing portion, nozzles to spray potable water on the ice as it emerges from the freezing section into the separator section, said nozzles spraying potable water on the washed ice as it passes into the trough to melt the same.

2. In a system for rendering a saline solution potable, the combination of a vessel, said vessel having a cylindrical section, means for refrigerating at least a portion of the cylindrical section, means to introduce saline solution into the vessel whereby ice is formed on the refrigerated section, a rotatable member to remove ice from the refrigerated section, means for rotating the rotatable member, means for spraying potable water on the ice emerging above the saline solution level in the vessel to wash the brine from the surface and interstices of the ice and means for spraying water on the washed ice to melt said ice.

3. In a method for rendering saline solution potable the steps which consist in passing a saline solution into a vessel, forming ice on the surface of a portion of said vessel, concentrating the brine solution in the bottom section of the vessel, removing the ice from the refrigerated section of the vessel and passing the ice in counterflow relation to the saline solution introduced into the vessel, separating the ice from the saline solution, and washing the brine from the surface and interstices of the ice so separated.

4. In a method for rendering saline solution potable, the steps which consist in passing a saline solution into a vessel, forming ice on the surface of a portion of the vessel, concentrating the brine solution in the bottom section of the vessel, removing the ice from the refrigerated section of the vessel, and passing the ice on counterflow relation to the saline solution introduced into the vessel, separating the ice from the saline solution, washing the brine from the surface and interstices of the ice so separated, and melting the ice by spraying potable water thereover.

References Cited in the file of this patent

UNITED STATES PATENTS

| | | |
|---|---|---|
| Re. 24,038 | Arnold | July 19, 1955 |
| 1,738,275 | Baker | Dec. 3, 1929 |
| 1,931,347 | Gay | Oct. 17, 1933 |
| 2,101,953 | Oman | Dec. 14, 1937 |
| 2,241,726 | Krause | May 13, 1941 |
| 2,315,762 | Ax et al. | Apr. 6, 1943 |
| 2,503,695 | Webb | Apr. 11, 1950 |
| 2,597,515 | Nitsch | May 20, 1952 |
| 2,613,513 | Shields | Oct. 4, 1952 |
| 2,617,273 | Findlay | Nov. 11, 1952 |
| 2,734,355 | Wenzelberger | Feb. 14, 1956 |
| 2,764,488 | Slattery | Sept. 25, 1956 |